United States Patent
Li et al.

(10) Patent No.: US 12,050,288 B2
(45) Date of Patent: *Jul. 30, 2024

(54) HIGH RESOLUTION LIDAR USING HIGH FREQUENCY PULSE FIRING

(71) Applicant: Innovusion Ireland Limited, Los Altos, CA (US)

(72) Inventors: Yimin Li, Los Altos, CA (US); Junwei Bao, Los Altos, CA (US)

(73) Assignee: Seyond, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,832

(22) Filed: Jun. 3, 2021

(65) Prior Publication Data
US 2021/0356567 A1 Nov. 18, 2021

Related U.S. Application Data (63) Continuation of application No. 15/857,563, filed on Dec. 28, 2017, now Pat. No. 11,054,508.
(Continued)

(51) Int. Cl.
*G01S 7/481* (2006.01)
*G01S 7/484* (2006.01)
(Continued)

(52) U.S. Cl.
CPC .......... *G01S 7/4865* (2013.01); *G01S 7/4817* (2013.01); *G01S 7/484* (2013.01); *G01S 7/4861* (2013.01); *G01S 17/10* (2013.01)

(58) Field of Classification Search
CPC ...... G01S 7/4865; G01S 17/10; G01S 7/4861; G01S 7/484; G01S 7/4817; G01S 7/4818;
(Continued)

(56) References Cited

U.S. PATENT DOCUMENTS 3,897,150 A 7/1975 Bridges et al.
4,412,720 A 11/1983 Costa
(Continued)

FOREIGN PATENT DOCUMENTS

AU 4604493 A 12/1993
CN 1662789 A 8/2005
(Continued)

OTHER PUBLICATIONS

'Forego' vs. 'Fargo': The E Is Important, Merriam-Webster, https://www.merriam-webster.com/words-at-play/usage-of-forego-vs-forgo, 11 pages.
(Continued)

*Primary Examiner* — Daniel L Murphy
(74) *Attorney, Agent, or Firm* — MASCHOFF BRENNAN; Liang Huang (57) ABSTRACT

In accordance with some embodiments, a light detection and ranging (LiDAR) scanning system includes a light source. The light source is configured to transmit a pulse of light. The LiDAR scanning system also includes a beam steering apparatus configured to steer the pulse of light in at least one of vertically and horizontally along an optical path. The beam steering apparatus is further configured to concurrently collect scattered light generated based on the light pulse illuminating an object in the optical path. The scattered light is coaxial or substantially coaxial with the optical path. The LiDAR scanning system further includes a light converging apparatus configured to direct the collected scattered light to a focal point. The LiDAR scanning system further includes a light detector, which is situated substantially at the focal point. In some embodiments, the light detector can include an array of detectors or detector elements.

27 Claims, 6 Drawing Sheets

Related U.S. Application Data (60) Provisional application No. 62/442,912, filed on Jan. 5, 2017.

(51) Int. Cl.
*G01S 7/4861* (2020.01)
*G01S 7/4865* (2020.01)
*G01S 17/10* (2020.01)

(58) Field of Classification Search
CPC ........ G01S 7/4863; G01S 7/487; G01S 17/42; G01S 17/46; G01S 7/4816; G01S 7/4814
USPC ....................................................... 356/5.01
See application file for complete search history.

(56) References Cited

U.S. PATENT DOCUMENTS

| | | |
|---|---|---|
| 4,464,048 A | 8/1984 | Farlow |
| 5,006,721 A | 4/1991 | Cameron et al. |
| 5,157,451 A | 10/1992 | Taboada et al. |
| 5,303,084 A | 4/1994 | Pflibsen et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,788,445 B2 | 9/2004 | Goldberg et al. |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,869,112 B2 | 1/2011 | Borchers et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,879,990 B2 | 1/2018 | Klepsvik et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,031,214 B2 | 7/2018 | Rosenzweig et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,054,508 B2 * | 7/2021 | Li ........................ G01S 7/4817 |
| 11,194,048 B1 | 12/2021 | Burbank et al. |
| 2002/0136251 A1 | 9/2002 | Green et al. |
| 2002/0196424 A1 | 12/2002 | Sano et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |

(56) References Cited

U.S. PATENT DOCUMENTS

| | | |
|---|---|---|
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0026008 A1 | 2/2011 | Gammenthaler |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspeil |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0329044 A1 | 11/2015 | Bernstein et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0025489 A1 | 1/2016 | Klepsvik et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0100928 A1 | 4/2018 | Keilaf et al. |
| 2018/0113200 A1 | 4/2018 | Steinberg et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0341009 A1 | 11/2018 | Niclass et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0309917 A1 | 10/2020 | Kudla et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 101105389 A | 1/2008 |
| CN | 101923163 A | 12/2010 |
| CN | 201749187 U | 2/2011 |
| CN | 103675796 A | 3/2014 |
| CN | 204758260 U | 11/2015 |
| CN | 204885804 U | 12/2015 |
| CN | 206331115 U | 7/2017 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 111328376 A | 6/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| DE | 11 2015 001 704 T5 | 12/2016 |
| DE | 10 2015 213 558 A1 | 1/2017 |
| EP | 0 757 257 A2 | 5/2002 |

(56) References Cited

FOREIGN PATENT DOCUMENTS

| | | |
|---|---|---|
| EP | 1 237 305 A2 | 9/2002 |
| EP | 1480057 A2 | 11/2004 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2003-4850 A | 1/2003 |
| JP | 2007144667 A | 6/2007 |
| JP | 2010035385 A | 2/2010 |
| JP | 2012-26921 A | 2/2012 |
| JP | 2017-003347 A | 1/2017 |
| JP | 2017-138301 A | 8/2017 |
| KR | 10-2009-0058866 A | 6/2009 |
| KR | 10-2012-0013515 A | 2/2012 |
| KR | 10-2013-0068224 A | 6/2013 |
| KR | 10-2018-0107673 A | 10/2018 |
| KR | 10-2018-0127599 A | 11/2018 |
| KR | 10-1925816 B1 | 12/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Oike, Yusuke et al., "High-speed and High-accuracy Position Sensor for 3-D Measurement Using Row Parallel Processing on the Sensor Plane," ITE Technical Report, 2001, vol. 25.55, 25.55, Session ID IPU2001-76, pp. 83-88, Released on J-STAGE Jun. 23, 2017, Online ISSN 2424-1970, Print ISSN 1342-6893, https://doi.org/10.11485/itetr.25.55.0_83, https://www.jstage.jst.go.jp/article/itetr/25.55/0/25.55_83/_article/-char/en, 6 pages.
Office Action issued in European Patent Application No. 18 736 685.1, dated Dec. 19, 2022, 8 pages.
Office Action Issued in Japanese Patent Application No. 2019-536925, dated Nov. 9, 2021, 8 pages.
"Mirrors", Physics LibreTexts, https://physlibretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al., (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
Office Action issued in Chinese Application No. 201680005907.3 dated Apr. 11, 2023, 12 pages.
Office Action issued in Korean Application No. 10-2019-7022585 dated Dec. 16, 2022, 20 pages.
Office Action issued in Chinese Patent Application No. 201880005907.3 dated Oct. 10, 2022, 16 pages.
Office Action issued in Chinese Patent Application No. 201880005907.3 dated May 26, 2023, 12 pages.
Office Action issued in Japanese Patent Application No. 2022-126767 dated Oct. 31, 2023, 8 pages.
Qikun, et al. "Design on omnidirectional optical system of lidar based on 2D MEMS mirror," Journal of Applied Optics, vol. 39 No. 4, Jul. 2018, 6 pages.

* cited by examiner

FIG. 1 (Conventional System)

HIGH RESOLUTION LIDAR USING HIGH FREQUENCY PULSE FIRING

CROSS-REFERENCE TO RELATED APPLICATIONS

This application is a continuation of U.S. patent application Ser. No. 15/857,563, filed on Dec. 28, 2017, which claims priority to U.S. Provisional Patent Application No. 62/442,912, filed on Jan. 5, 2017, the content of each of which is herein incorporated by reference in its entirety.

FIELD OF THE DISCLOSURE

The present disclosure generally relates to a light detection and ranging (LiDAR) system and, more specifically, to systems and methods for achieving high resolution in the field of view using high frequency pulse generation and detection.

BACKGROUND OF THE DISCLOSURE

A LiDAR system can be used to measure the distance between an object and the system. Specifically, the system can transmit a signal (e.g., using a light source), record a returned signal (e.g., using light detectors), and determine the distance by calculating the delay between the returned signal and the transmitted signal.

SUMMARY OF THE DISCLOSURE

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a light detection and ranging (LiDAR) scanning system can include a light source. The light source is configured to transmit one or more light pulses. The LiDAR scanning system can also include a beam steering apparatus configured to steer the pulse of light in at least one of vertical and horizontal directions along an optical path. The beam steering apparatus is further configured to concurrently collect the scattered light generated based on the light pulse illuminating an object in the optical path. The scattered light can be coaxial or substantially coaxial with the optical path. The LiDAR scanning system can further include a light converging apparatus configured to direct the collected scattered light to a focal point or plane. The LiDAR scanning system can further include a light detector, which can be disposed at or in proximity to the focal point or plane. In some embodiments, the light detector can include an array of detectors or detector elements. The LiDAR scanning system can further include an electrical processing and computing device electrically coupled to the light source and the light detector. The electrical processing and computing device can be configured to determine a distance from the LiDAR to an object. The distance to an object can be determined based on a time difference between transmitting the light pulse and detecting the corresponding scattered light. In some embodiments, the time intervals of consecutive light pulses may be smaller than the round-trip time for a light pulse to reach the farthest objects in a pre-determined distance according to the LiDAR system specification. Therefore the return light pulses (e.g., the scattered light) may arrive at the light detector in an order different from the order in which the corresponding light pulses are transmitted by the LiDAR system. In some embodiments, each of these pulses can be differentiated using an array of detector elements and/or using encoded signals.

In accordance with some embodiments, a light detection and ranging (LiDAR) scanning system is provided. The system includes a light source configured to transmit a light pulse; a beam steering apparatus configured to steer the light pulse in at least one of vertical and horizontal directions along an optical path; a light detector coupled to the beam steering apparatus, and an electrical processor and computer device electrically coupled to the light source and the light detector. The light detector comprises a plurality of detector elements and is configured to detect a scattered light generated based on the light pulse illuminating an object in the optical path. The electrical processor and computer device is configured to: obtain a location profile of the scattered light; based on the obtained location profile, obtain data relating to a movement of the beam steering apparatus; and based on the obtained data, determine a correlation between the transmitted light pulse and the detected scattered light.

In accordance with some embodiments, a computer-implemented method for operating a light detection and ranging (LiDAR) system, which comprises a light source, a beam steering apparatus, and a light detector having a plurality of detector elements, comprises: transmitting, with the light source, a light pulse; steering, with the beam steering apparatus, the light pulse in at least one of vertical and horizontal directions along an optical path; detecting, with the light detector, a scattered light generated based on the light pulse illuminating an object in the optical path; obtaining a location profile of the scattered light; based on the obtained location profile, obtaining data relating to a movement of the beam steering apparatus; and based on the obtained data, determining a correlation between the transmitted light pulse and the detected scattered light.

BRIEF DESCRIPTION OF THE DRAWINGS

For a better understanding of the various described aspects, reference should be made to the description below, in conjunction with the following figures in which like-referenced numerals refer to corresponding parts throughout the figures.

DETAILED DESCRIPTION

One type of LiDAR system generates a short pulse of light, collimates it to a narrow beam, and sends it to a direction in the field of view. If the light pulse reaches an object, the scattered light is collected by the detector and the distance of the scattering spot can be calculated from the time the pulse is transmitted from the LiDAR and the time the scattered light pulse reaches the detector of the LiDAR. Through a beam steering mechanism, the direction of the light beam can raster in the field of view. An exemplary beam steering mechanism or apparatus is described in detail in the U.S. Provisional Patent Application No. 62/441,280 filed on Dec. 31, 2016, entitled "Coaxial Interlaced Raster Scanning System for LiDAR," and the U.S. Non-provisional patent application Ser. No. 15/721,127 filed on Sep. 29, 2017, entitled "2D Scanning High Precision LiDAR Using Combination of Rotating Concave Mirror and Beam Steering Devices," the content of which is incorporated herein in its entirety for all purposes.

Figure 1:
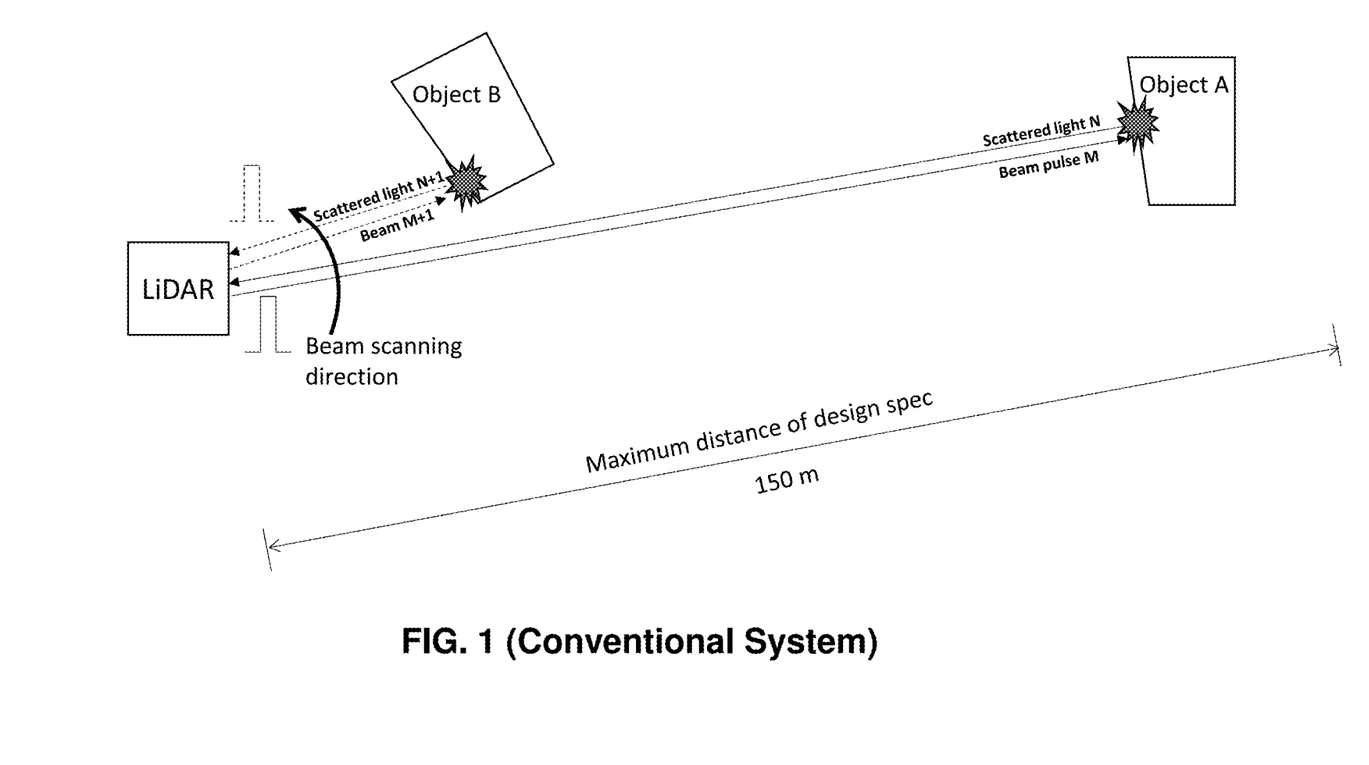
FIG. 1 illustrates a conventional LiDAR scanning system.

In order to achieve a higher angular resolution, it is desirable to send out light pulses and detect the return light pulses (e.g., scattered light) in a high frequency (i.e., at smaller time intervals). However, in order to differentiate returning signals generated from consecutive light pulses, the shortest time interval between consecutive light pulses is limited by the maximum time it takes for a light pulse to travel round trip to the furthest distance the LiDAR is designed for. As shown in FIG. 1, a light pulse for beam position M+1 is transmitted after a light pulse for beam position M is transmitted. However, Object B, which scatters the later transmitted light pulse for beam position M+1, is closer to the LiDAR system than Object A, which scatters the earlier transmitted light pulse for beam position M. Thus, the light pulse for beam position M+1 may return (as scattered light N+1) before the light pulse for beam position M returns (as scattered light N), if the light pulse for beam position M+1 is transmitted before the scattered light N returns. As a result, it is difficult to differentiate between the return signals as to which return signal corresponds to which scattered light (e.g., scattered light from Object A or Object B).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Examples of LiDAR scanning systems will now be presented with reference to various elements of apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The present disclosure describes a LiDAR scanning system that is capable of scanning a light beam in at least one of the vertical or horizontal directions and transmitting light pulses in high frequency (i.e., at small time intervals) to achieve high resolution in the field of view.

In the following description of examples, reference is made to the accompanying drawings which form a part hereof, and in which is shown by way of illustration specific examples that can be practiced. It is to be understood that other examples can be used and structural changes can be made without departing from the scope of the disclosed examples.

Although the following description uses terms "first," "second," etc. to describe various elements, these elements should not be limited by the terms. These terms are only used to distinguish one element from another. For example, a first pulse signal could be termed a second pulse signal, and, similarly, a second pulse signal could be termed a first pulse signal, without departing from the scope of the various described embodiments. The first pulse signal and the second pulse signals are both pulse signals, but they may not be the same pulse signal.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Transmitting and detecting light pulses at a higher frequency (i.e., at smaller time intervals) results in higher resolution of image frames. Consider an example in which the predetermined maximum distance for LiDAR detection is about 150 meters and thus the maximum time for the round-trip flight of the light pulse is about 1 microsecond. In a conventional LiDAR scanning system (e.g., a single detector element LiDAR scanning system as shown in FIG. 1), the shortest time interval for consecutive light pulses is thus about 1 microsecond and thus the maximum number of points that can be collected by the detector per second is about 1 million points (i.e., 1 second/1 microsecond=1 million points). Thus, for a 20 frames per second ("fps") setting, the 1 million aggregating points are collected to form 20 frames, with points for each single frame being collected within a 50-millisecond window (i.e., 50 milliseconds per frame×20 fps=1 second). Accordingly, the maximum number of points in one frame is about 50,000 (i.e., 1 million points/20 frames). The number of points per frame indicates the resolution and it is desirable to increase the number of points per frame so as to increase the resolution. Thus, it is desirable to transmit and detect light pulses at smaller time intervals to obtain higher resolution in each frame.

Figure 2A:
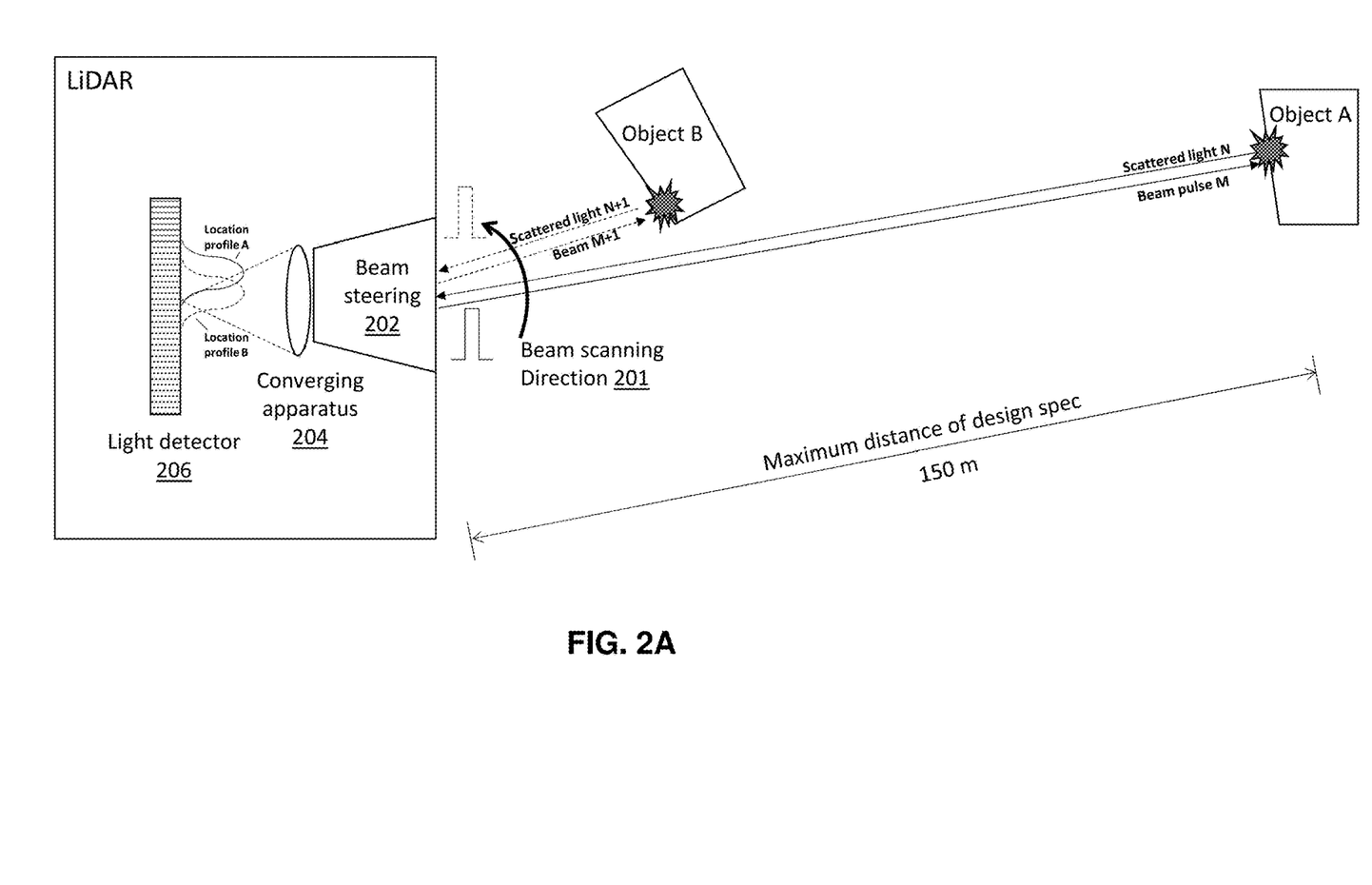
FIG. 2A illustrates an exemplary LiDAR scanning system according to examples of the disclosure.

FIG. 2A illustrates an exemplary LiDAR scanning system according to examples of the disclosure. In some embodiments, a LiDAR scanning system can include a light source, a beam steering apparatus 202, a light converging apparatus 204, a light detector 206, and an electrical processing and computing device (e.g., a microprocessor). The light source can be configured to transmit one or more light pulses (e.g., beam M, beam M+1). For example, the light source may be a laser source that emits or transmits laser pulses. The beam steering apparatus 202 can be configured to steer the one or more light pulses in at least one of vertical and horizontal directions along an optical path, and concurrently collect scattered light generated based on the one or more light pulses illuminating an object in the optical path. The scattered light can be coaxial or substantially coaxial with the optical path. In the depicted example, the beam steering apparatus steers the light pulses in a vertical direction as indicated by beam scanning direction 201.

Figure 2B:
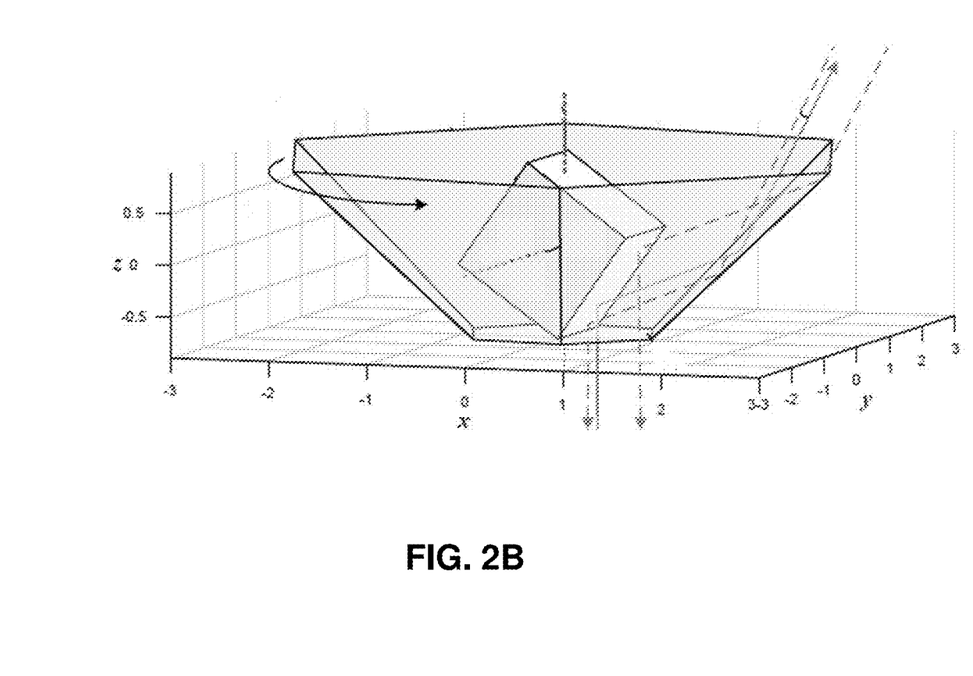
FIG. 2B illustrates an exemplary beam steering apparatus according to examples of the disclosure.

FIG. 2B illustrates an exemplary beam steering apparatus in a LiDAR scanning system according to some embodiments of the disclosure. As depicted, the beam steering apparatus includes a polyhedron reflector situated within the concave reflector that is aligned about a central axis. The concave reflector is configured to spin about the central axis. The polyhedron is configured to spin about a pivot in a direction perpendicular to the central axis. The respective instantaneous positions of the concave reflector and the polyhedron steer pulses of light to illuminate objects in a field of view, while collecting scattered light from the pulses of light scattered at the objects. Each transmitted pulse of light is coaxial or substantially coaxial with the collected scattered light from the corresponding pulse of light. The exemplary beam steering mechanism or apparatus is described in detail in the U.S. Provisional Patent Application No. 62/441,280 filed on Dec. 31, 2016, entitled "Coaxial Interlaced Raster Scanning System for LiDAR," and U.S. Non-provisional patent application Ser. No. 15/721,127, filed on Sep. 29, 2017, entitled "2D Scanning High Precision LiDAR Using Combination of Rotating Concave Mirror and Beam Steering Devices," the content of which is incorporated herein in its entirety for all purposes. It should be appreciated by one of ordinary skill in the art that the above-described beam steering apparatus is exemplary and that techniques described herein to differentiate scattered lights may be used in conjunction with other types of beam steering apparatus.

Returning to FIG. 2A, the LiDAR system further includes a light converging apparatus 204 configured to direct the collected scattered light to a focal point or plane. In the depicted example in FIG. 2A, the light converging apparatus includes one or more optical lens devices that operate (e.g., focuses, disperses, modifies, splits, etc.) on lights. Using the light converging apparatus 204, the collected scattered light can be directed to a focal point or plane for light detection and/or image generation by the light detector 206, which is located in proximity to or at the focal point.

The light detector 206 includes a detector array that can be used to differentiate among the scattered light pulses collected in an order different from the order in which the corresponding light pulses were transmitted. As shown in FIG. 2A, the earlier transmitted pulse M is scattered by Object A, resulting in a scattered light N (among other scattered lights) that is coaxial or substantially coaxial with the transmitted light pulse M. The scattered light N is directed by the light converging apparatus 204 and lands on the light detector 206. Based on how the scattered light N lands on the detector array, the LiDAR system obtains a location profile A.

The location profile A can be used by the LiDAR system (e.g., the electrical processing and computing device of the LiDAR system) to determine which transmitted light pulse the scattered light N corresponds to. As discussed above, the beam steering apparatus 202 moves (e.g., rotates) in the beam scanning direction 201 during the round trip of the light pulse M. As such, when the scattered light N lands on the light detector 206, the location of the beam steering apparatus 202 (along with the light detector 206) has shifted from when the light pulse M was transmitted. Thus, the scattered light N lands on the light detector 206 at an angle different from the original angle between the light detector 206 and the transmitted pulse M. The angle at which the scattered light N lands on the light detector affects the location profile A. For example, the center of the landing area of the scattered light N would be at the center of the detector array, if the beam steering apparatus 202 remained stationary. But the center of the landing area would be a distance away from the center of the detector array, if the beam steering apparatus 202 has moved during the roundtrip travel of the light pulse, directing the returning beam at a different angle. In some instances, a longer roundtrip travel by the light pulse corresponds to a larger movement of the beam steering apparatus 202, which in turn results in a longer distance between the center of the landing area of the scattered light and the center of the detector array.

Thus, in operation, the LiDAR system (e.g., the electrical processing and computing device of the LiDAR system) can analyze the location profile of the collected scattered light to determine which transmitted light pulse the collected light corresponds to. In some embodiments, the LiDAR system first determines a weighted center of the landing area (on the detector array) based on the location of the landing area as imaged on the detector array and the signal intensity as detected by the detector element. The LiDAR system then determines the distance between the center of the landing area and the location where the scattered light would have landed had the light detector remained stationary ("shifting distance"). Based on the shifting distance, the LiDAR system can obtain information related to the movement of the beam steering apparatus 202, for example, the angle at which the returning beam lands at the light detector 206 shifted during the travel time of the light pulse (shifting angle=shifting distance/focal length). Based on the obtained movement information (e.g., shifting angle) and the known data on the movement of the beam steering apparatus 202 (e.g., the speed at which the beam steering apparatus moves), the LiDAR system can determine the approximate roundtrip travel time of the light pulse and, furthermore, differentiate whether the pulse is from the scattered light at Object A or Object B.

In some examples, the detector array can be placed at or near the focal plane of the light converging apparatus 206 (e.g., focusing lens) in the same direction as the fastest angle swiping direction. For example, the detector array may be disposed parallel to the light converging apparatus 204. Without beam steering or scanning, the scattered light spot in the field of view may be imaged on a few pixels in the detector array. In one example, if the focal length is about 5.3 centimeters and the diverging angle of the outgoing scanning laser beam is about 0.1° (i.e., the outgoing light beam is not a perfect parallel beam), the light spot imaged on the detector array is about 100 micrometers, assuming no significant optical aberrations.

Figure 3:
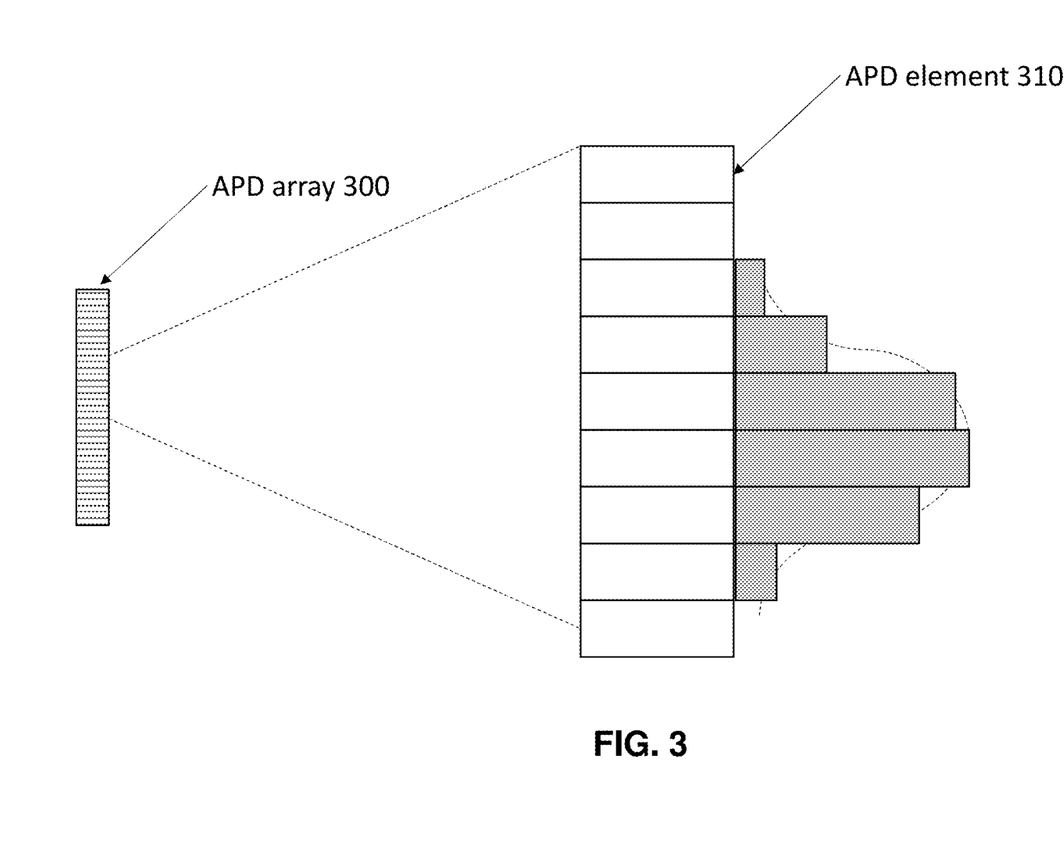
FIG. 3 illustrates an exemplary light detector including an array of detectors or detector elements according to examples of the disclosure.

FIG. 3 illustrates an exemplary light detector including an array of detectors or detector elements. The detector array can be an array of avalanche photodiode (APD) elements. In some embodiments, some or all the APD elements can be implemented on a same die of a semiconductor wafer, and isolated with etched trenches filled with isolation material.

In some embodiments, the detector array can be implemented by placing and packaging multiple already-diced discrete APDs closely to each other. The pitch of the detector array can be, for example, 20 micrometers, with one to two micrometers isolation in between neighboring APD elements. Therefore, for the 100 micrometers light spot landing on the detector array, the center of the vertical position of the light spot can be calculated based on curving-fitting of the signal intensity of the detector array signal.

Figure 5:
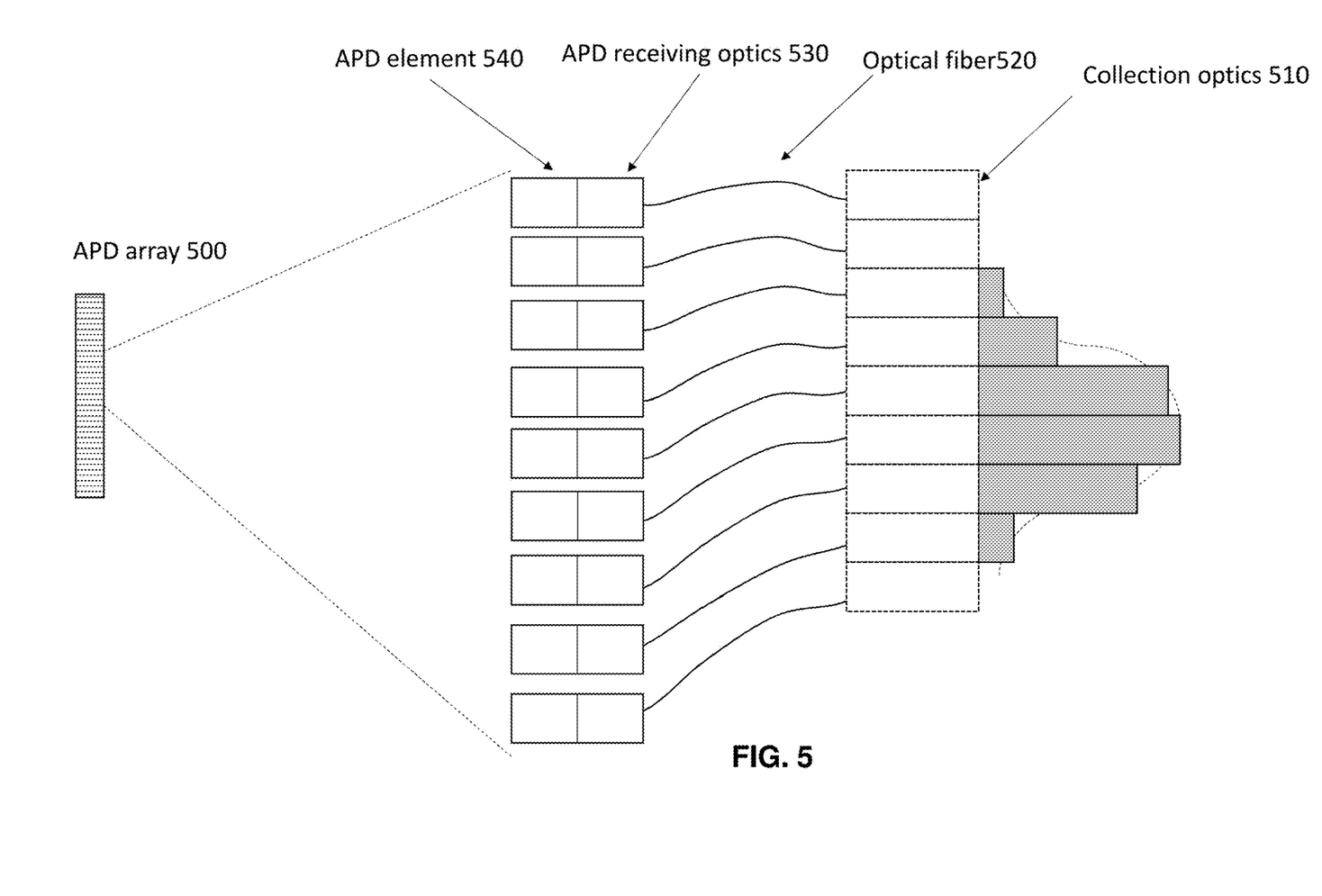
FIG. 5 illustrates another exemplary light detector including an array of detectors or detector elements according to examples of the disclosure.

FIG. 5 illustrates another exemplary light detector. An optional collection optics 510 collects and directs the light illuminating at its receiving area to the tip of the optical fiber 520. This light signal transmits through and emits at the other end of the optical fiber 520, gets collected by the APD receiving optics 530 directed to the APD element 540. Multiple modules of collection optics 510 can be aligned together to form a one- or two-dimensional array where the receiving areas of these modules are aligned next to each other with gaps as small as possible in between the receiving areas.

Using a detector array, the time interval between the consecutive light pulses of a laser beam (e.g., beam M and beam M+1) can be configured to be less than the round-trip time for a light pulse to reach the farthest objects in a pre-determined distance according to the LiDAR system specification. For example, the time interval between the consecutive light pulses can be 0.1 microseconds, such that the maximum number of points in one frame for a 20 fps setting can be 500,000. This can significantly increase the resolution in each frame.

As an example of using a detector array in a LiDAR scanning system, the beam steering apparatus may steer the laser beam at a very high speed of 0.36° per microseconds. For a first light pulse that reaches an object positioned at 150 meters away, the round-trip travel time is about 1 microsecond. Accordingly due to the beam steering or scanning, at the time that the scattered light of this first light pulse reaches the detector, it is as if it is from about 0.36° away from the optical axis, thus reaching the detector array at about 360 micrometers away from the center of the detector array. As illustrated in FIG. 2A, assuming at time 0, the first light pulse at beam position M is transmitted from the LiDAR. This first light pulse reaches Object A at 150 meters away. Thus, at time 1 microsecond, the scattered light generated based on the first light pulse reaches the detector array, at about 360 micrometers away from the center of the detector array. At time 0.1 microseconds, a second light pulse at beam position M+1 is transmitted from the LiDAR. This second pulse reaches Object B at 30 meters away. Thus, at time 0.2 microseconds, this second pulse's scattered light reaches the detector array, earlier than the scattered light from the first pulse. However, because the image of the scattered light generated based on this second light pulse lands at about 72 micrometers away from the center position of the detector array, it can be easily differentiated from the image of the scattered light generated based on the first pulse.

In some embodiments, when the LiDAR system receives multiple scattered lights after transmitting a pulse signal, the LiDAR system can determine multiple candidate travel times (i.e., the time of flight) corresponding to the multiple scattered lights by calculating the time differences between the time of transmission and the times when the scattered lights are detected. From the multiple candidate travel times, one candidate travel time can be selected to calculate the distance. Specifically, for each of the detected scattered lights, a shifting distance, a shifting angle, and a travel time can be determined based on the landing area of the scattered light on the detector array in the manner described above. The system can then compare, for each scattered light, the candidate travel time (calculated via direct measurement of time) with the travel time calculated based on the landing area of the scattered light. For the scattered light that actually corresponds to the transmitted pulse signal, the candidate travel time and the travel time calculated based on the landing area should be similar or identical. Thus, after the comparisons, the system can select the candidate travel time for which the comparison has yielded the smallest difference and use the selected candidate travel time to calculate a distance.

In some embodiments, when the LiDAR system receives multiple scattered lights after transmitting a pulse signal, the LiDAR system can determine multiple candidate travel times (i.e., the time of flight) corresponding to the multiple scattered lights using the geometry, angle, electrical phase, and/or electrical frequency of the scattered lights). From the multiple candidate travel times, one candidate travel time can be selected. Specifically, for each of the detected scattered lights, a shifting distance, a shifting angle, and a travel time can be determined based on the landing area of the scattered light in the manner described above. The system can then compare, for each scattered light, the candidate travel time and the travel time calculated based on the landing area of the scattered light. For the scattered light that actually corresponds to the transmitted pulse signal, the candidate travel time and the travel time calculated based on the landing area should be similar or identical. Thus, after the comparisons, the system can select the candidate travel time for which the comparison has yielded the smallest difference and use the selected candidate travel time to calculate a distance.

Figure 4:
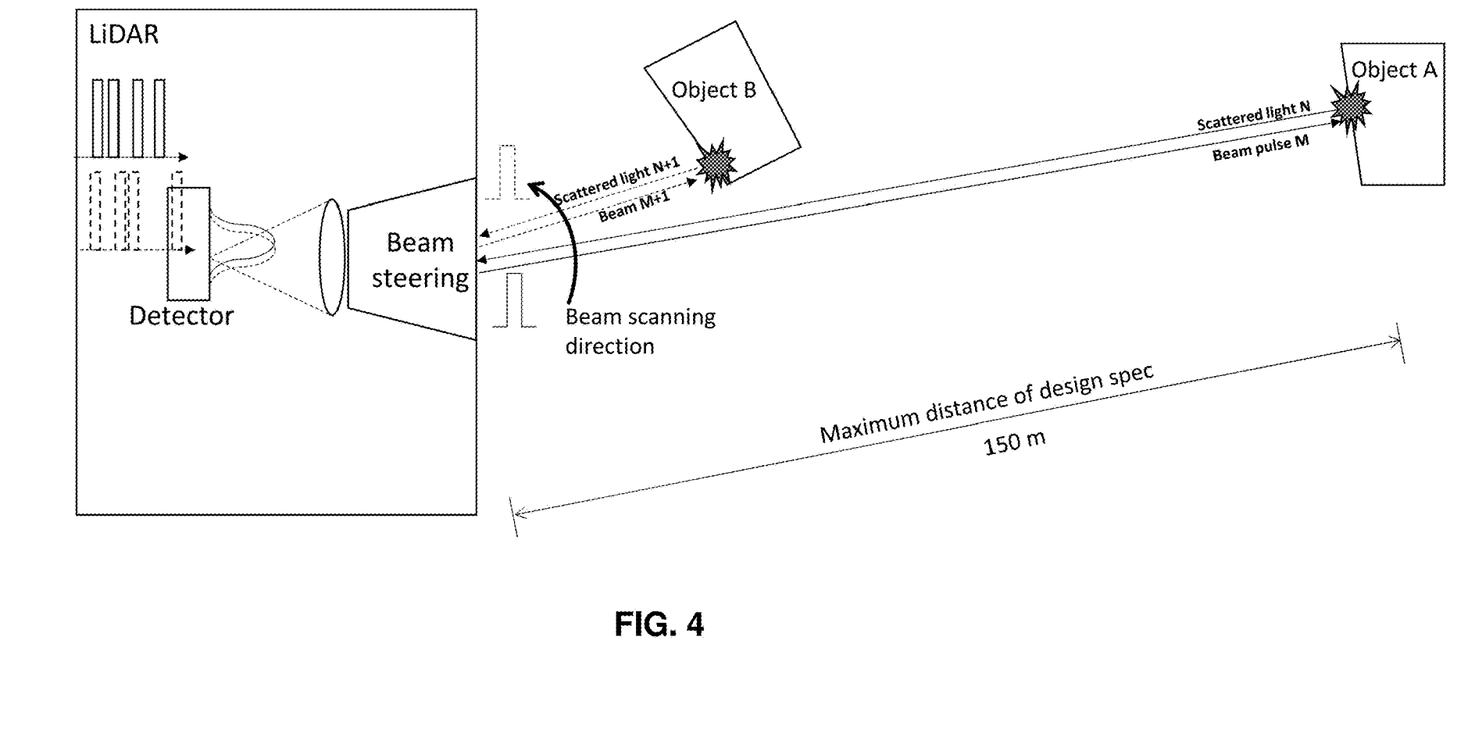
FIG. 4 illustrates another exemplary LiDAR scanning system according to examples of the disclosure.

FIG. 4 illustrates another exemplary LiDAR scanning system according to examples of the disclosure. The LiDAR scanning system illustrated in FIG. 4 can include components similar to those described above with respect to FIGS. 2 and 3. In addition or alternatively, as illustrated in FIG. 4, each of the light pulse transmitted from the LiDAR scanning system can be encoded (e.g., using pseudorandom binary sequence "PRBS" code) and thus include encoding information that differentiates one light pulse from another. The encoded light pulse reaches an object and scattered light is generated. The scattered light is thus also encoded. The light detector can decode such encoding information in the received scattered light, therefore mapping it or correlate it back to a particular transmitted light pulse that has the same encoding information. As a result, the light detector can uniquely identify each scattered light pulse in a plurality of scattered light pulses despite that the scattered light pulses may reach the detector (e.g., a detector array) at a sequence different from the sequence their corresponding light pulses were transmitted from the LiDAR scanning system. The details of the light pulse encoding and decoding are described in detail in the U.S. Provisional Patent Application No. 62/442,758 filed on Jan. 5, 2017, entitled "METHOD AND SYSTEM FOR ENCODING AND DECODING LIDAR," the content of which is incorporated herein in its entirety for all purposes.

What is claimed is:

1. A light detection and ranging (LiDAR) scanning system configured for detecting a physical object by transmitting a light pulse and collecting a plurality of scattered light pulses, the system comprising an electrical processing and computing device configured to perform:

determining a plurality of candidate travel times associated with the plurality of scattered light pulses with respect to the transmitted light pulse;

obtaining a plurality of location profiles corresponding to the plurality of scattered light pulses detected by a light detector;

determining, for each of the plurality of scattered light pulses with respect to the transmitted light pulse, a travel time based on the plurality of location profiles;

selecting a candidate travel time based on a correlation between the plurality of candidate travel times and the travel time determined for each of the plurality of scattered light pulses; and calculating, based on the candidate travel time selected, a distance of the physical object from the LiDAR scanning system.

2. The system of claim 1, wherein determining the plurality of candidate travel times comprises:

determining at least one of the plurality of candidate travel times based on a time difference between a time at which the light pulse is transmitted and at least one time at which at least one of the plurality of scattered light pulses is detected.

3. The system of claim 1, wherein determining the plurality of candidate travel times comprises:

determining at least one of the plurality of candidate travel times based on at least one of a geometry, an angle, a phase, or a frequency of one or more of the plurality of scattered light pulses.

4. The system of claim 1, wherein each of the plurality of location profiles represents a light intensity distribution associated with a corresponding scattered light pulse of the plurality of scattered light pulses.

5. The system of claim 1, wherein the light detector comprises an array of light detector elements configured to provide landing area data associated with the plurality of scattered light pulses.

6. The system of claim 1, wherein determining a travel time based on the plurality of location profiles comprises, for each of the plurality of scattered light pulses:

determining, based on a corresponding location profile of the plurality of location profiles, a shifting distance associated with the corresponding scattered light pulse of the plurality of scattered light pulses; and determining the travel time based on the shifting distance.

7. The system of claim 6, wherein determining the shifting distance associated with the corresponding scattered light pulse of the plurality of scattered light pulses comprises:

determining, based on the corresponding location profile of the plurality of location profiles, a weighted center of a landing area associated with the corresponding scattered light pulse of the plurality of the scattered light pulses; and determining the shifting distance based on the weighted center of the landing area.

8. The system of claim 7, wherein determining the weighted center of the landing area is based on a location of the landing area and a signal intensity.

9. The system of claim 7, wherein the shifting distance corresponds to a distance between the weighted center of the landing area and a location where the corresponding scattered light pulse of the plurality of scattered light pulses would have landed on the light detector had the light detector remained stationary.

10. The system of claim 6, wherein determining the travel time based on the shifting distance comprises:

obtaining, based on the shifting distance, data related to movement of a beam steering apparatus of the LiDAR scanning system; and determining the travel time based on the data related to movement of the beam steering apparatus of the LiDAR scanning system and known movement data of the beam steering apparatus.

11. The system of claim 10, wherein the data related to movement of the beam steering apparatus of the LiDAR scanning system comprises a shifting angle.

12. The system of claim 10, wherein the known movement data of the beam steering apparatus comprises a speed at which the beam steering apparatus moves.

13. The system of claim 1, wherein selecting the candidate travel time based on the correlation between the plurality of candidate travel times and the travel time determined for each of the plurality of scattered light pulses comprises:

comparing, for each of the plurality of scattered light pulses, a corresponding candidate travel time of the plurality of candidate travel times and a corresponding travel time determined based on a corresponding location profile of the plurality of location profiles; and selecting the candidate travel time based on a result of the comparisons for each of the plurality of scattered light pulses.

14. The system of claim 13, wherein selecting the candidate travel time based on the result of the comparisons for each of the plurality of scattered light pulses comprises:

selecting the candidate travel time for which the result indicates a smallest difference between the plurality of candidate travel times and the travel time determined for each of the plurality of scattered light pulses based on the plurality of location profiles.

15. A computer-implemented method for determining a distance of a physical object based on a light pulse transmitted and a plurality of scattered light pulses collected, by a light detection and ranging (LiDAR) scanning system, the method being performed by an electrical processing and computing device and comprising:

determining a plurality of candidate travel times associated with the plurality of scattered light pulses with respect to the transmitted light pulse;

obtaining a plurality of location profiles corresponding to the plurality of scattered light pulses detected by a light detector;

determining, for each of the plurality of scattered light pulses with respect to the transmitted light pulse, a travel time based on the plurality of location profiles;

selecting a candidate travel time based on a correlation between the plurality of candidate travel times and the travel time determined for each of the plurality of scattered light pulses; and calculating, based on the candidate travel time selected, the distance of the physical object from the LiDAR scanning system.

16. A non-transitory computer readable medium storing one or more programs for calculating a distance of a physical object from a light detection and ranging (LiDAR) scanning system based on a transmitted light pulse and a plurality of scattered light pulses, the one or more programs comprising instructions, which when executed by an electrical processing and computing device, cause the electrical processing and computing device to:

determine a plurality of candidate travel times associated with the plurality of scattered light pulses with respect to the transmitted light pulse;

obtain a plurality of location profiles corresponding to the plurality of scattered light pulses detected by a light detector;

determine, for each of the plurality of scattered light pulses with respect to the transmitted light pulse, a travel time based on the plurality of location profiles;

select a candidate travel time based on a correlation between the plurality of candidate travel times and the travel time determined for each of the plurality of scattered light pulses; and calculate, based on the candidate travel time selected, the distance of the physical object from the LiDAR scanning system.

17. A light detection and ranging (LiDAR) scanning system, comprising:
a light source configured to transmit a light pulse;
a beam steering apparatus configured to steer the light pulse and to collect a scattered light, wherein the scattered light is generated based on the light pulse illuminating an object in an optical path;
a light detector coupled to the beam steering apparatus, wherein the light detector is configured to detect the scattered light; and
an electrical processing and computing device electrically coupled to the light source and the light detector, the electrical processing and computing device being configured to:
obtain a location profile of the scattered light on the light detector; and
based on the location profile, determine a correlation between the transmitted light pulse and the detected scattered light.

18. The LiDAR scanning system of claim 17, wherein the electrical processing and computing device is further configured to determine a distance to the object.

19. The LiDAR scanning system of claim 17, wherein the location profile represents a light intensity distribution associated with the scattered light on a plurality of detector elements of the light detector.

20. The LiDAR scanning system of claim 17, wherein the determination of the correlation between the transmitted light pulse and the detected scattered light based on the location profile comprises configuring the electrical processing and computing device to:
determine a center of a landing area of the scattered light based on the location profile.

21. The LiDAR scanning system of claim 20, wherein the electrical processing and computing device is further configured to:
based on the center of the landing area, determine a shifting distance; and
based on the shifting distance, determine a shifting angle.

22. The LiDAR scanning system of claim 21, wherein the electrical processing and computing device is further configured to, based on the shifting angle, determine a travel time of the transmitted light pulse.

23. The LiDAR scanning system of claim 22, wherein the electrical processing and computing device is further configured to:
determine a candidate travel time based on a time at which the light pulse is transmitted and a time at which the scattered light is detected;
compare the candidate travel time with the travel time determined based on the shifting angle; and
based on a comparison result, determine the correlation between the transmitted light pulse and the detected scattered light.

24. The LiDAR scanning system of claim 22, wherein the electrical processing and computing device is further configured to:
determine a candidate travel time based on information related to the scattered light;
compare the candidate travel time with the travel time determined based on the shifting angle; and
based on a comparison result, determine the correlation between the transmitted light pulse and the detected scattered light.

25. The LiDAR scanning system of claim 17, wherein the electrical processing and computing device is further configured to calculate a distance to the object based on the correlation between the transmitted light pulse and the detected scattered light.

26. The LiDAR scanning system of claim 17, where the light source is configured to consecutively transmit light pulses at a time interval that is shorter than a round-trip time for a light pulse to travel between the LiDAR scanning system and a farthest-reachable object of the LiDAR scanning system.

27. A method for determining a distance of a physical object, the method being performed by a light detection and ranging (LiDAR) system having a beam steering apparatus, a light detector, and an electrical processing and computing device, the method comprising:
steering, with the beam steering apparatus, a light pulse to illuminate an object in an optical path;
collecting, with the beam steering apparatus, a scattered light generated based on the light pulse illuminating the object in the optical path;
detecting, with the light detector, the scattered light;
obtaining a location profile of the scattered light on the light detector; and
based on the obtained location profile, determining a correlation between the light pulse illuminating the object in the optical path and the detected scattered light.

* * * * *